(12) United States Patent
Steiner

(10) Patent No.: US 11,041,458 B2
(45) Date of Patent: Jun. 22, 2021

(54) THERMOACOUSTIC TRANSDUCER APPARATUS INCLUDING A WORKING VOLUME AND RESERVOIR VOLUME IN FLUID COMMUNICATION THROUGH A CONDUIT

(71) Applicant: Etalim Inc., Vancouver (CA)

(72) Inventor: Thomas Walter Steiner, Burnaby (CA)

(73) Assignee: ETALIM INC., Burnaby (CA)

( * ) Notice: Subject to any disclaimer, the term of this patent is extended or adjusted under 35 U.S.C. 154(b) by 28 days.

(21) Appl. No.: 16/621,195

(22) PCT Filed: Jun. 15, 2018

(86) PCT No.: PCT/CA2018/000120
§ 371 (c)(1),
(2) Date: Dec. 10, 2019

(87) PCT Pub. No.: WO2018/227272
PCT Pub. Date: Dec. 20, 2018

(65) Prior Publication Data
US 2020/0240357 A1 Jul. 30, 2020

Related U.S. Application Data

(60) Provisional application No. 62/520,327, filed on Jun. 15, 2017.

(51) Int. Cl.
*F02G 1/043* (2006.01)
*F25B 9/14* (2006.01)
*F03G 7/00* (2006.01)

(52) U.S. Cl.
CPC ............. *F02G 1/043* (2013.01); *F03G 7/002* (2013.01); *F25B 9/145* (2013.01); *F02G 2243/54* (2013.01); *F02G 2257/00* (2013.01)

(58) Field of Classification Search
CPC .. F02G 2243/54; F02G 2243/52; F02G 1/043; F02G 1/0435; F02G 1/053;
(Continued)

(56) References Cited

U.S. PATENT DOCUMENTS 4,398,398 A 8/1983 Wheatley et al.
4,489,553 A * 12/1984 Wheatley ................ F02G 1/043
60/516

(Continued)

FOREIGN PATENT DOCUMENTS

CN 1670365 A 9/2005

OTHER PUBLICATIONS

International Search Report and Written Opinion issued by the Canadian Intellectual Property Office in connection with International Patent Application No. PCT/CA2018/000120, dated Aug. 21, 2018, 6 pages.

*Primary Examiner* — Mark A Laurenzi
*Assistant Examiner* — Xiaoting Hu

(57) ABSTRACT

A thermoacoustic transducer apparatus is disclosed including at least one thermal converter operable to provide power conversion between acoustic power and thermal power in a pressurized working gas contained within a working volume, a portion of which extends through the thermal converter. The thermoacoustic transducer is operable to cause a periodic flow in the working gas during operation. The apparatus also includes a reservoir volume in fluid communication with the working volume through a conduit having a working volume end in fluid communication with the working volume and a reservoir volume end in fluid communication with the reservoir volume. The conduit has a bore size and length operable to cause pressure oscillations at the working volume end to be converted to flow oscillations at the reservoir volume end such that periodic fluid flow at the reservoir volume end is at least twice as large as
(Continued)

periodic fluid flow at the working volume end thereby facilitating a steady fluid flow along the conduit for equalization of working gas static pressures between the working volume and the reservoir volume while providing a sufficiently high acoustic impedance at the working volume end to minimize losses due to periodic flows of working gas within the conduit.

21 Claims, 4 Drawing Sheets

(58) Field of Classification Search
CPC ...... F02G 1/057; F02G 2257/00; F25B 9/145; F25B 2309/1402; F25B 2309/1403; F25B 2309/1405; F25B 2309/1413; F25B 2309/1414; F25B 2309/1419; F25B 2309/1421; F25B 2309/1424; F25B 2309/14241; F03G 7/00; F03G 7/002; F01K 27/00
See application file for complete search history.

(56) References Cited

U.S. PATENT DOCUMENTS

| | | | | |
|---|---|---|---|---|
| 4,722,201 A * | 2/1988 | Hofler | ............ | F25B 9/145 60/516 |
| 4,953,366 A * | 9/1990 | Swift | ............ | F25B 9/145 60/721 |
| 5,966,943 A * | 10/1999 | Mitchell | ............ | F25B 9/145 60/520 |
| 6,021,643 A * | 2/2000 | Swift | ............ | F25B 9/145 62/6 |
| 6,032,464 A * | 3/2000 | Swift | ............ | F25B 9/145 60/520 |
| 6,442,947 B1 * | 9/2002 | Mitchell | ............ | F25B 9/04 60/520 |
| 6,564,552 B1 * | 5/2003 | Ward | ............ | F01B 11/00 123/46 R |
| 7,174,721 B2 * | 2/2007 | Mitchell | ............ | F25B 9/145 62/259.2 |
| 9,091,463 B1 | 7/2015 | Dodson | | |
| 2003/0019218 A1 * | 1/2003 | Hofmann | ............ | F25B 9/145 62/6 |
| 2003/0196441 A1 * | 10/2003 | Swift | ............ | F02G 1/0435 62/6 |
| 2003/0226364 A1 * | 12/2003 | Swift | ............ | F25B 9/145 62/6 |
| 2007/0044484 A1 * | 3/2007 | Gedeon | ............ | F25B 9/145 62/6 |
| 2009/0249797 A1 * | 10/2009 | Backhaus | ............ | F25B 9/145 62/6 |
| 2011/0100024 A1 | 5/2011 | Yuan et al. | | |
| 2013/0239564 A1 | 9/2013 | Steiner et al. | | |
| 2015/0247491 A1 * | 9/2015 | Steiner | ............ | F02G 1/043 60/518 |
| 2019/0376469 A1 * | 12/2019 | Medard De Chardon | ............ | F02G 1/043 |

* cited by examiner

THERMOACOUSTIC TRANSDUCER APPARATUS INCLUDING A WORKING VOLUME AND RESERVOIR VOLUME IN FLUID COMMUNICATION THROUGH A CONDUIT

BACKGROUND

1. Field

This disclosure relates generally to thermoacoustic transducers and more particularly to a thermoacoustic transducer having a reservoir volume.

2. Description of Related Art

Thermoacoustic transducers may be configured to convert between mechanical energy and thermal energy through periodic flow of a working gas within a working volume. In operation as a heat engine, higher temperature thermal energy is received and lower temperature thermal energy rejected while the transducer converts a portion of the thermal energy into mechanical energy, which may be used to drive an electrical generator, for example. Alternatively a thermoacoustic transducer may be configured to operate as a heat pump where mechanical energy is received and the transducer converts the mechanical energy into a thermal energy transfer from lower temperature to higher temperature.

SUMMARY

In accordance with one disclosed aspect there is provided a thermoacoustic transducer apparatus including at least one thermal converter operable to provide power conversion between acoustic power and thermal power in a pressurized working gas contained within a working volume, a portion of which extends through the thermal converter. The thermoacoustic transducer is operable to cause a periodic flow in the working gas during operation. The apparatus also includes a reservoir volume in fluid communication with the working volume through a conduit having a working volume end in fluid communication with the working volume and a reservoir volume end in fluid communication with the reservoir volume. The conduit has a bore size and length operable to cause pressure oscillations at the working volume end to be acoustically converted to flow oscillations at the reservoir volume end such that periodic fluid flow at the reservoir volume end is at least twice as large as periodic fluid flow at the working volume end thereby facilitating a steady fluid flow along the conduit for equalization of working gas static pressures between the working volume and the reservoir volume while providing a sufficiently high acoustic impedance at the working volume end to minimize losses due to periodic flows of working gas within the conduit.

At least a portion of the working volume may be enclosed within the reservoir volume.

A pressure differential due to temperature changes may be established between the working gas in the reservoir volume and in the working volume including the portion of the working volume enclosed within the reservoir volume, and the bore size of the conduit may be selected to facilitate equalization of working gas static pressures between the working volume and the reservoir volume at a rate commensurate with the period of time during which temperatures are changing at commencement of operation of the apparatus.

The portion of the working volume enclosed within the reservoir volume may include a portion of the working volume within the at least one thermal converter, and the working gas within the reservoir volume may act to provide thermal insulation between the portion of the working volume within the at least one thermal converter and an environment surrounding the reservoir volume.

The thermal converter may include a flow passage defined by walls and wherein the portion of the working volume enclosed within the reservoir volume may include a portion of the working volume within the walls of the at least one thermal converter and wherein equalization of working gas static pressures between the working volume and the reservoir volume reduces a pressure differential between the thermal converter and the reservoir volume facilitating a reduced thickness of the walls within the thermal converter, the reduced wall thickness being operable to reduce thermal conduction along the walls and to reduce thermal stresses in the walls.

The conduit may have a length of between about an eighth of a wavelength and about three-eighths of a wavelength.

For a periodic flow of working gas having a frequency of about 500 Hz, the conduit may have a diameter greater than about 300 μm.

The apparatus may include a mechanical converter including a portion of the working volume, the mechanical converter being operable to provide power conversion between acoustic power and mechanical power in the working gas, the at least one thermal converter and the mechanical converter being in fluid communication via a further portion of the working volume operable to cause the periodic flow in the working gas during operation.

The mechanical converter may include a first chamber and a second chamber separated by at least one diaphragm, the at least one thermal converter including a flow passage in fluid communication with each of the first and second chambers and extending through the at least one thermal converter to form an acoustic power loop, the acoustic power loop in conjunction with periodic movement of the diaphragm being operable to cause the periodic flow in the working gas during operation.

The conduit may include at least two bores each having respective working volume ends in fluid communication with spaced apart portions of the working volume.

The at least two bores may include a first bore and a second bore and the working volume end of the first bore may be in fluid communication with a first portion of the working volume and the working volume end of the second bore is in fluid communication with a second portion of the working volume, and a working gas periodic flow velocity amplitude or pressure amplitude at the first portion of the working volume may differ from a working gas periodic flow velocity amplitude or pressure amplitude at the second portion of the working volume thus causing a steady flow of working gas between the first portion of the working volume, through the first bore to the reservoir volume and from the reservoir volume through the second bore to the second portion of the working volume.

The working volume may include a flow passage between the first portion of the working volume and the second portion of the working volume and the flow passage may include a narrowed portion operably configured to increase a flow velocity of the periodic flow of working gas within the flow passage thus reducing the working gas static pressure proximate the narrowed portion, one of the working ends of the at least two bores being disposed in fluid communication with the working volume proximate the narrowed portion, the reduced working gas static pressure being operable to increase the steady flow of working gas.

The reservoir volume may be in thermal communication with one of a heat source and a heat sink and the steady flow of working gas may be operable to transfer heat between the reservoir volume and the thermal converter.

The portion of the working volume that extends through the thermal converter may be in fluid communication with a thermal buffer section of the working volume that separates two different locations of the working volume at differing temperatures, and the steady flow of working gas may be selected to change the working gas temperature distribution within the thermal buffer to change an effective acoustic length of the thermal buffer section of the working volume.

The steady flow of working gas may be selected by adjusting a valve within one of the conduits or the reservoir volume operable to control the steady flow of working gas.

A capacity of the reservoir volume may be selected to be sufficiently large in comparison with a capacity of the working volume to reduce effects due to leakage of working gas from the thermoacoustic transducer.

A capacity of the reservoir volume may be selected to reduce a static pressure change due to changes in the operating temperature within the thermal converter.

The working gas may include at least one of hydrogen and helium.

The working volume end of the conduit may be in fluid communication with a portion of the working volume having a low working gas pressure swing amplitude in comparison with other portions of the working volume.

The reservoir volume may include a fluid port for connecting to a supply of working gas, the fluid port having a valve selectively operable to permit recharging of the reservoir volume and working volume to replace working gas that is lost due to leakage from the thermoacoustic transducer.

The fluid port may act as a vacuum port for connecting to a vacuum source during an initial evacuation of the working volume and reservoir volume prior to charging the working volume with the working gas.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1:
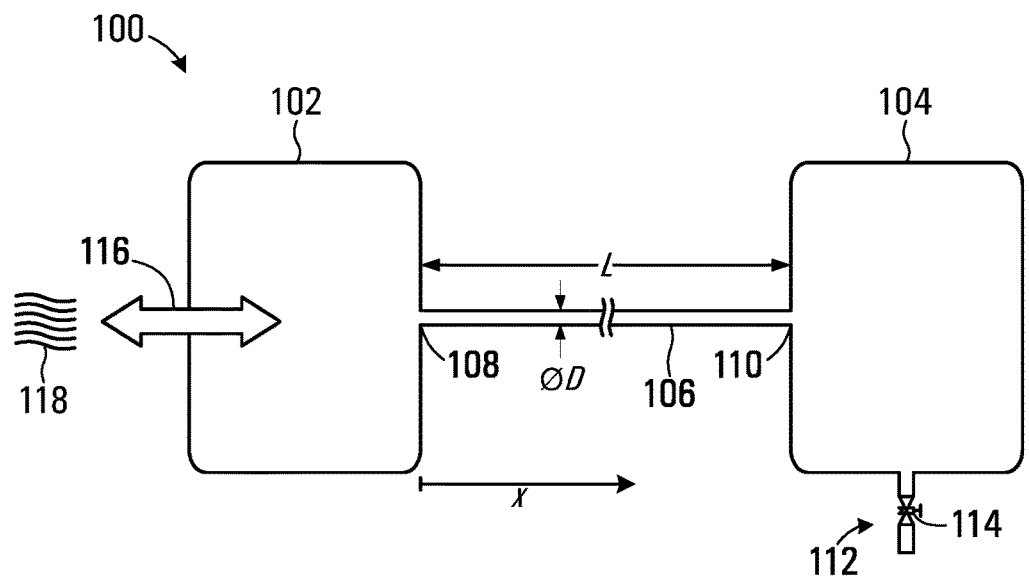
FIG. 1 is a schematic representation of a thermoacoustic transducer apparatus according to one embodiment.

Referring to FIG. 1, a schematic representation of a thermoacoustic transducer apparatus according to one disclosed embodiment is shown in generally at 100. The thermoacoustic transducer 100 has a working volume 102 for containing a pressurized working gas and includes at least one thermal converter 116 operable to provide power conversion between acoustic power and thermal power in the pressurized working gas contained within a portion of the working volume that extends through the thermal converter. The thermal converter is configured to transfer thermal energy between an external energy source and/or sink 118 and is operable to cause a periodic flow in the working gas during operation.

The thermoacoustic transducer 100 also includes a reservoir volume 104 in fluid communication with the working volume 102 through a conduit 106. The conduit 106 has a working volume end 108 in fluid communication with the working volume 102 and a reservoir volume end 110 in fluid communication with the reservoir volume 104. The conduit has a bore size (D) and length (L) operable to cause periodic pressure swings at the working volume end 108 to be acoustically converted to flow oscillations at the reservoir volume end 110 such that periodic fluid flow at the reservoir volume end is at least twice as large as periodic fluid flow at the working volume end. The conduit 106 facilitates a steady fluid flow along the conduit for equalization of working gas static pressures between the working volume 102 and the reservoir volume 104 while providing a sufficiently high acoustic impedance at the working volume end 108 to minimize losses due to periodic flows of working gas within the conduit. The flow resistance of a conduit is proportional to $1/D^4$ and the length of the conduit L. In one embodiment the diameter of the conduit may be about 300 µm or greater, which thus represents a substantially reduced flow resistance as compared to a 20 µm pinhole even if flow length is substantial in comparison to the pin hole flow length.

The conduit 106 has an advantage over providing a small aperture or pinhole between the volumes for permitting fluid pressures to equalize. Pinhole diameters may be limited in size to somewhere in the region of 20 µm to avoid introducing significant acoustic losses during operation of the thermoacoustic transducer. However the size constraint also causes generally slow pressure equalization between working and reservoir volumes.

Figure 2:
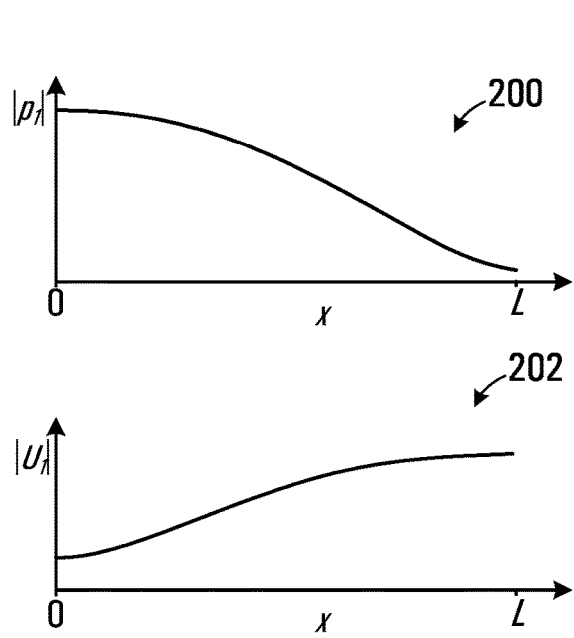
FIG. 2 is a graphical depiction of a magnitude of a pressure swing amplitude and magnitude of a flow oscillation amplitude along a length of a conduit shown in FIG. 1.

Referring to FIG. 2, a graphical depiction of the magnitude of pressure swing amplitude $|p_1|$ along the length of the conduit 106 is shown at 200, where $p_1$ is a complex variable defining the amplitude and phase of the periodic acoustic pressure swing. A corresponding graphical depiction of the magnitude of flow oscillation amplitude $|U_1|$ along the length of the conduit 106 is shown at 202, where $U_1$ is a complex variable defining the amplitude and phase of volumetric flow oscillations. The x-axis of the graphs 200 and 202 corresponds to the x location along the conduit 106, with x=0 being at the working volume end 108 and x=L being at the reservoir volume end 110. The pressure swings at the working volume end 108 are thus converted to flow oscillations at the reservoir volume end 110. The acoustic impedance is given by:

$$Z = \frac{p_1}{U_1} \qquad \text{Eqn 1}$$

The conduit 106 length L and diameter D are selected to acoustically tune the conduit 106 to provide a high acoustic impedance z at the working volume end 108 where the pressure swing amplitude |p₁| is maximum in order to drive very little oscillating flow oscillation amplitude |U₁| at the working volume end of the conduit. At the reservoir volume end 110 the pressure swing amplitude |p₁| is smaller and the flow oscillation amplitude |U₁| is larger. The conduit 106 thus causes very small losses of acoustic power from the working volume 108 at a periodic frequency associated with periodic flows within the working volume 102 due to the high impedance z. However steady state flow is facilitated along the conduit 106 between the reservoir volume 104 and the working volume 102 for equalization of working gas static pressures.

In the embodiment shown in FIG. 1, the reservoir volume 104 includes a fluid port 112 for connecting to a supply of working gas (not shown). The fluid port 112 includes a valve 114 that is operable to permit recharging of the reservoir volume 104 and working volume 102 to replace working gas that may be lost due to leakage from the thermoacoustic transducer 100. An advantage associated with locating the fluid port 112 in fluid communication with the working volume 102 via the reservoir volume 104 rather than in direct fluid communication with the working volume 102 is that ports and valves represent additional losses due to oscillating pressure and flows of working gas. Locating the fluid port 112 in fluid communication with the reservoir volume 104 places the conduit 106 between the fluid port 112 and the working volume 102 facilitating a steady fluid flow of working gas while providing sufficiently high acoustic impedance at the working volume end 108 to acoustically isolate the working volume from the reservoir volume thereby preventing losses due to periodic oscillations in the working gas at the fluid port. In one embodiment the fluid port 112 may act as a vacuum port for connecting to a vacuum source during an initial evacuation of the working volume 102 and reservoir volume 104 prior to charging the working volume with the working gas.

Figure 3:
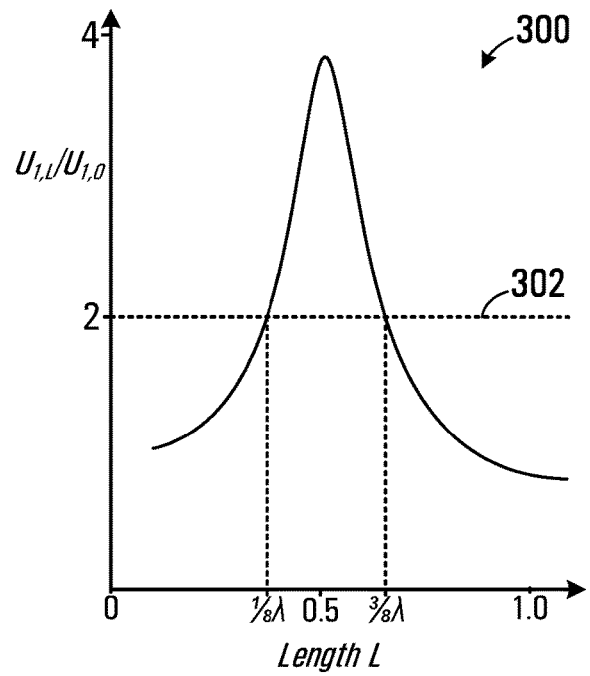
FIG. 3 is a graphical depiction of the periodic fluid flow at a reservoir volume end of the conduit shown in FIG. 1 as a ratio of the periodic fluid flow at a working volume end of the conduit.

The periodic fluid flow at the working volume end 108 as a ratio of the periodic fluid flow at the reservoir volume end 110 is shown graphically in FIG. 3 at 300 for a specific choice of conduit diameter D. The graph 300 thus plots the ratio:

$$\frac{|U_{1,L}|}{|U_{1,0}|}, \qquad \text{Eqn 2}$$

where $U_{1,0}$ is the periodic fluid flow at the working volume end 108 and $U_{1,L}$ is the periodic fluid flow at the reservoir volume end 110 as a function of the length L of the conduit 106. When the ratio in Eqn 2 is greater than 2 (i.e. above the line 302 on the graph 300), then the acoustic impedance at the working volume end 108 is considered to be sufficiently high to minimize losses due to periodic flows of working gas within the conduit 106.

Under these conditions, the conduit would have a length of between about an eighth of a wavelength and about three-eighths of a wavelength. For example, in one embodiment the working gas may be a gas such as helium at a static pressure $p_m$ of about 120 bar and the periodic flow of working gas may have a frequency of about 500 Hz. The speed of sound within the working volume at ambient temperature will be about 1000 ms$^{-1}$ corresponding to a wavelength of about 2 meters. The length of the conduit 106 may thus be between about 0.25 meters and 0.75 meters. The bore size of the conduit may have a diameter of about 300 µm or greater to cause a periodic fluid flow at the reservoir volume end 110 that is at least twice as large as periodic fluid flow at the working volume end 108.

Figure 4:
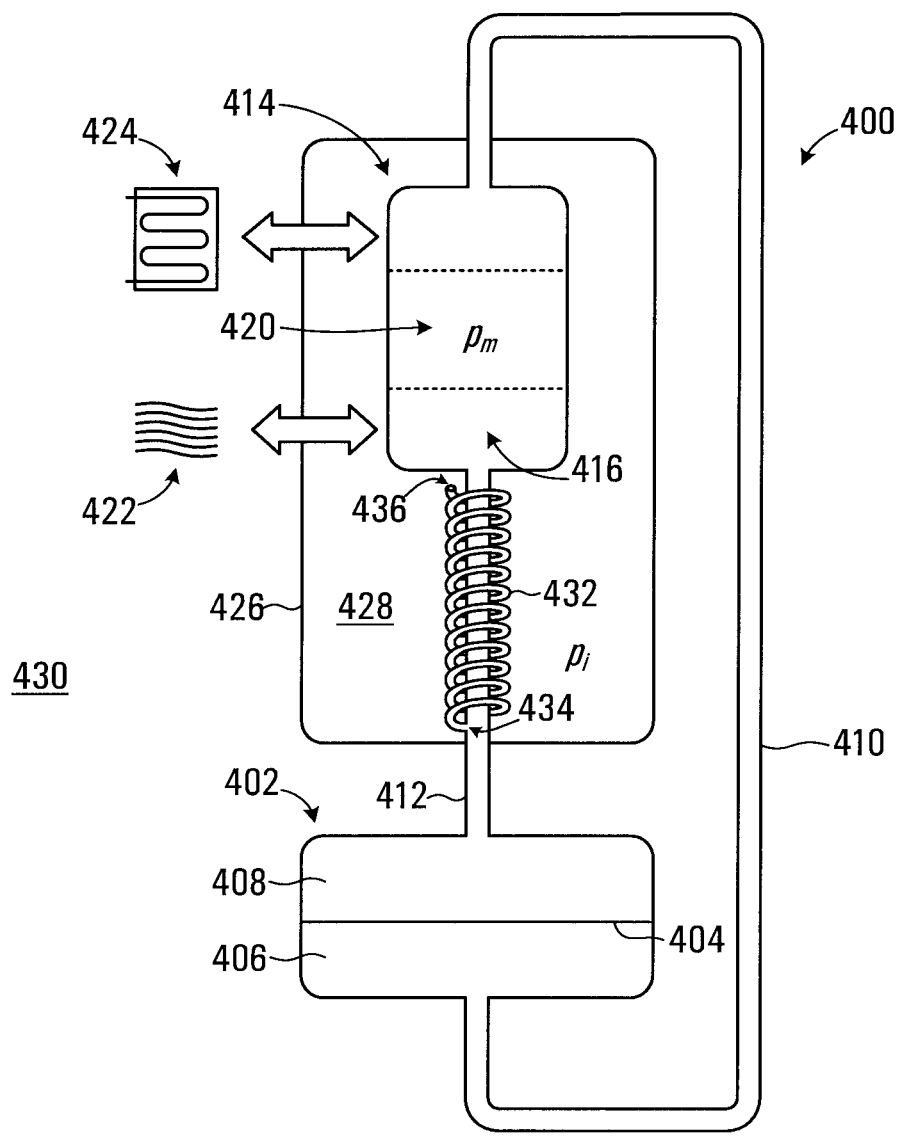
FIG. 4 is a schematic representation of another embodiment of a thermoacoustic transducer.

Referring to FIG. 4, another embodiment of the thermoacoustic transducer is shown at 400. In this embodiment the thermoacoustic transducer 400 includes a mechanical converter 402 including a first chamber 406 and a second chamber 408 separated by a diaphragm 404. The thermoacoustic transducer 400 also includes a thermal converter 414 having a flow passage 416, which is in fluid communication with the first chamber 406 of the mechanical converter 402 via the duct 410 and in fluid communication with the second chamber 408 via the duct 412. The flow passage 416 of the thermal converter 414 includes a regenerator portion 420 thermally coupled to provide power conversion between acoustic power and thermal power. The mechanical converter 402 provides power conversion between acoustic power and mechanical power in the working gas. The first and second chambers 406 and 408, the ducts 410 and 412, and the flow passage 416, together define the working volume of the thermoacoustic transducer 400.

In one embodiment the thermal converter 414 may be configured as disclosed in commonly owned U.S. provisional patent application Ser. No. 62/426,418 filed on Nov. 25, 2016 and entitled "Apparatus for Performing Energy Transformation between Thermal Energy and Acoustic Energy", which is incorporated herein by references in its entirety.

The ducts 410 and 412 form an acoustic power loop through the flow passage 416 between the first chamber 406 and second chamber 408. The acoustic power loop in conjunction with periodic movement of the diaphragm is operable to cause the periodic flow in the working gas during operation. During operation of the thermoacoustic transducer 400, the diaphragm 404 is operable to undergo resilient displacement to cause pressure oscillations within the acoustic power loop, and the working gas pressure within the working volume will thus swing between $p_m \pm |p_1|$, where $p_m$ is the working gas pressure |p₁| is the pressure swing amplitude. When the diaphragm 404 is displaced so as to cyclically reduce and expand a volume of the first chamber 406, the resulting compression and rarefaction in the working gas produces acoustic power which propagates through the duct 410 to the thermal converter 414.

In one embodiment the ducts 410 and 412 may have lengths configured as disclosed in commonly owned published PCT patent application WO 2014/043790, filed on Sep. 17, 2013 and entitled "Thermoacoustic Transducer Apparatus Including a Transmission Duct", which is incorporated herein by references in its entirety.

In one embodiment the regenerator portion 420 of the thermal converter 414 is configured to receive thermal energy from an external source 422 and to transfer thermal energy to an external sink 424, and to convert a portion of the thermal energy into acoustic energy for operation of the apparatus as a heat engine. The regenerator portion 420 of the thermal converter 414 then operates to convert thermal energy provided from the external source 422 into acoustic energy, thereby amplifying the acoustic power traveling through the regenerator portion 420 of the thermal converter 414. The amplified acoustic power leaving the thermal converter 414 propagates along duct 412 back to the mechanical converter 402, where it is received in the second chamber 408. Pressure oscillations due to the amplified acoustic power in the second chamber 408 are operable to cyclically displace the diaphragm 404, thereby transferring acoustic power back to the first chamber 406. The diaphragm 404 may be coupled to transmit mechanical power to an external system (not shown in FIG. 4). The amplification of acoustic power in the thermal converter 414 thus provides sufficient power for sustaining periodic movement of the diaphragm 404, while also providing useful mechanical output power. The process described above operates at a natural frequency associated with the thermoacoustic transducer 400.

Alternatively for operation of the apparatus as a heat pump, mechanical power is transmitted to the diaphragm 404 to cause the cyclic displacement of the diaphragm. The regenerator portion 420 of the thermal converter 414 is configured to receive acoustic energy generated within the thermoacoustic transducer 400 and to convert the acoustic energy into a transfer of thermal energy from the external source 422 to external sink 424, at higher temperature than the temperature of the external source 422.

In the embodiment shown in FIG. 4, the thermal converter 414 is enclosed within a housing 426 that defines a volume 428, which acts as the reservoir volume. A portion of the working volume within the flow passage 416 of the thermal converter 414 and the ducts 410 and 412 is thus enclosed within the reservoir volume 428. The reservoir volume 428 is charged with working gas to a pressure $p_i$, where $p_i \approx p_m$. In this embodiment the conduit is implemented as a conduit 432 optionally coiled around the duct 412 within the reservoir volume 428. The conduit 432 has a working volume end 434 in fluid communication with the working volume via the duct 412. The conduit 432 also has an open end 436 in communication with the reservoir volume 428, which acts as the reservoir volume end of the conduit 432. The conduit 432 has an overall coiled length of L as described above. The arrangement of the working volume, conduit 432, and reservoir volume 428 in FIG. 4 is thus essentially equivalent to the configuration shown schematically in FIG. 1.

In this embodiment the working gas within the reservoir volume 428 also acts to provide thermal insulation between the portion of the working volume within the at least one thermal converter 414 and an environment 430 surrounding the reservoir volume. In operation portions of the thermal converter 414 may reach elevated temperatures (for example ~800° C.) and the working gas together with a convection suppressing insulation (not shown) within the reservoir volume 428 reduces the loss of heat to the environment thus improving the efficiency of exchange of heat with the working gas within the thermal converter 414.

One advantage that may be associated with the arrangement shown in FIG. 4, is that while the static pressure $p_m$ within the thermal converter 414 may be quite significant (for example 120 bar), the static pressure $p_i$ within the reservoir volume 428 equalizes via the conduit 432 to have a similar magnitude. The components of the thermal converter 414 defining the flow passage 416 thus do not have to be designed to withstand the full static pressure differential between the working gas static pressure $p_m$ and the ambient atmospheric pressure of the environment. For example, the flow passage 416 in the thermal converter 414 will generally be defined by walls that in the embodiment shown in FIG. 4 do not need to withstand a substantial pressure differential, thus permitting use of relatively thin wall cross sections. The thin wall cross section reduces thermal conduction along the walls and thermal stresses in these walls.

In the embodiment shown in FIG. 4, the working volume end 434 of the conduit is in fluid communication with a portion of the working volume that has low working gas pressure swing amplitude in comparison with other portions of the working volume. The low working gas pressure swing amplitude at this point further reduces losses by driving less flow into the conduit 432, which has a fixed impedance set by the conduit dimensions.

In one embodiment the capacity of the reservoir volume 428 may be selected to be sufficiently large in comparison with a capacity of the working volume to reduce effects due to leakage of working gas from the thermoacoustic transducer 400. For example in one embodiment the reservoir volume 104 may have a capacity of about 10 liters, while the working volume 102 may have a capacity of about 1 liter. Working gasses such as Helium and Hydrogen have very small molecules and some materials used for sealing the working volume may permit leakage of working gas over time, making replenishment necessary. The larger overall working gas volume of 11 liters, in this example, extends the operating time of the thermoacoustic transducer 400 before recharging of the working gas is required.

Additionally, at commencement of operation of the thermoacoustic transducer 400, a temperature change will generally be established between the working gas in the reservoir volume 428 and working volume, including the working gas in the portion of the working volume enclosed within the reservoir volume (i.e. within the flow passage 416 of the thermal converter 414 and within the ducts 410 and 412). The temperature differential between the working volume and the reservoir volume 428 causes a differential pressure between the volumes. The bore size D of the conduit 432 may thus be selected to facilitate equalization of working gas static pressures between the working volume and the reservoir volume 428 at a rate commensurate with the period of time during which temperatures are changing at commencement of operation of the apparatus. The equalization of pressures between the working volume and reservoir volume 428 also reduces a differential pressure that the thermal converter 414 is required to withstand during commencement of operation of the thermoacoustic transducer 400. The capacity of the reservoir volume 428 may also be selected to reduce a static pressure change in the thermoacoustic transducer 400 due to the temperature change. The capacity of the reservoir volume 428 may thus be selected to be large in comparison to a portion of the working volume within the thermal converter 414 that undergoes a significant temperature change, thus reducing the change in static pressure within the thermoacoustic transducer 400.

Figure 5:
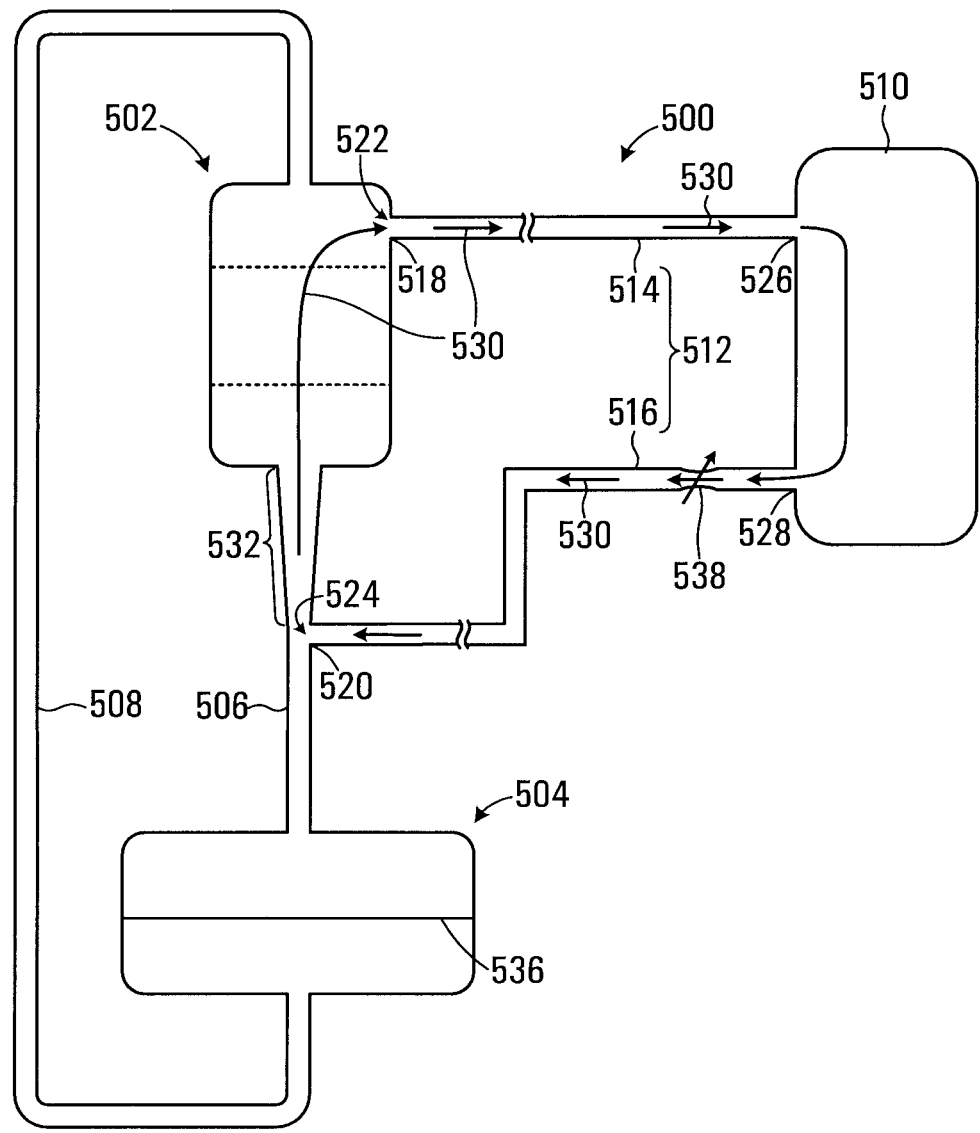
FIG. 5 is a schematic representation of a further embodiment of a thermoacoustic transducer.

Referring to FIG. 5, another thermoacoustic transducer embodiment is shown generally at 500 and includes a thermal converter 502 and a mechanical converter 504 connected via ducts 506 and 508 constituting a working volume. The thermoacoustic transducer 500 also includes a reservoir volume 510, which is in communication with the working volume via a conduit 512. In this embodiment the conduit 512 has two separate bores 514 and 516 that provide fluid communication between the working volume and the reservoir volume 510. Each of the bores 514 and 516 has a respective working volume end 518 and 520 in fluid communication with spaced apart first and second portions 522 and 524 of the working volume. The bores 514 and 516 also have respective reservoir volume ends 526 and 528 at the reservoir volume 510. Each of the bores 514 and 516 has a length L selected as described above to cause pressure oscillations at the working volume ends 518 and 520 to be converted to flow oscillations at the reservoir volume ends 526 and 528 such that periodic fluid flow at the reservoir volume ends is at least twice as large as periodic fluid flow at the working volume ends. In the embodiment shown in FIG. 5, the first portion 522 of the working volume is within the thermal converter 502. In other embodiments, the conduit 512 may include more than two separated bores or may be connected to different portions of the working volume The working gas periodic flow velocity amplitude or pressure amplitude at the first portion 522 of the working volume differs from the working gas periodic flow velocity amplitude or pressure amplitude at the second portion 524, which causes a steady flow of working gas between the first portion 522 of the working volume, through the bore 514 to the reservoir volume 510 and from the reservoir volume through the second bore 516 to the second portion 524 of the working volume. The steady flow follows from Bernoulli's principle and in the embodiment shown causes a small steady flow within the thermal converter 502 in the direction indicated by arrows 530. Adjustment of the steady flow of working gas may be provided through a valve in either of the bores 514 and 516 or within the reservoir volume 510. In FIG. 5, a controllable orifice valve is shown at 538 for adjusting a magnitude of the steady flow.

In the embodiment shown in FIG. 5, the duct 506 has a section 532 configured to act as a thermal buffer tube. In operation of the thermoacoustic transducer 500, the thermal converter 502 will have a significant temperature differential with respect to the mechanical converter 504 and the thermal buffer tube 532 provides a thermal separation between the respective working volume portions within the thermal converter and mechanical converter. A small steady flow 530 changes a working gas temperature distribution within the thermal buffer 532 and for the flow direction shown results in an increased effective acoustic length of the thermal buffer thus providing some acoustic tuning capability by changing the magnitude of the small steady flow with valve 538. The steady flow 530 is dependent on the difference between periodic flow velocity amplitude or pressure amplitude at the portions 522 and 524 of the working volume. In this embodiment the thermal buffer tube 532 has a cross-sectional shape that is tapered in diameter between the thermal converter 502 and where the thermal buffer connects to the duct 506. In other embodiments the thermal buffer tube 532 may not be tapered and may be included as an additional length making up the duct 506. The thermal buffer tube is operable to reduce convective heat transfer due to circulating gas flows within the thermal buffer.

Figure 6:
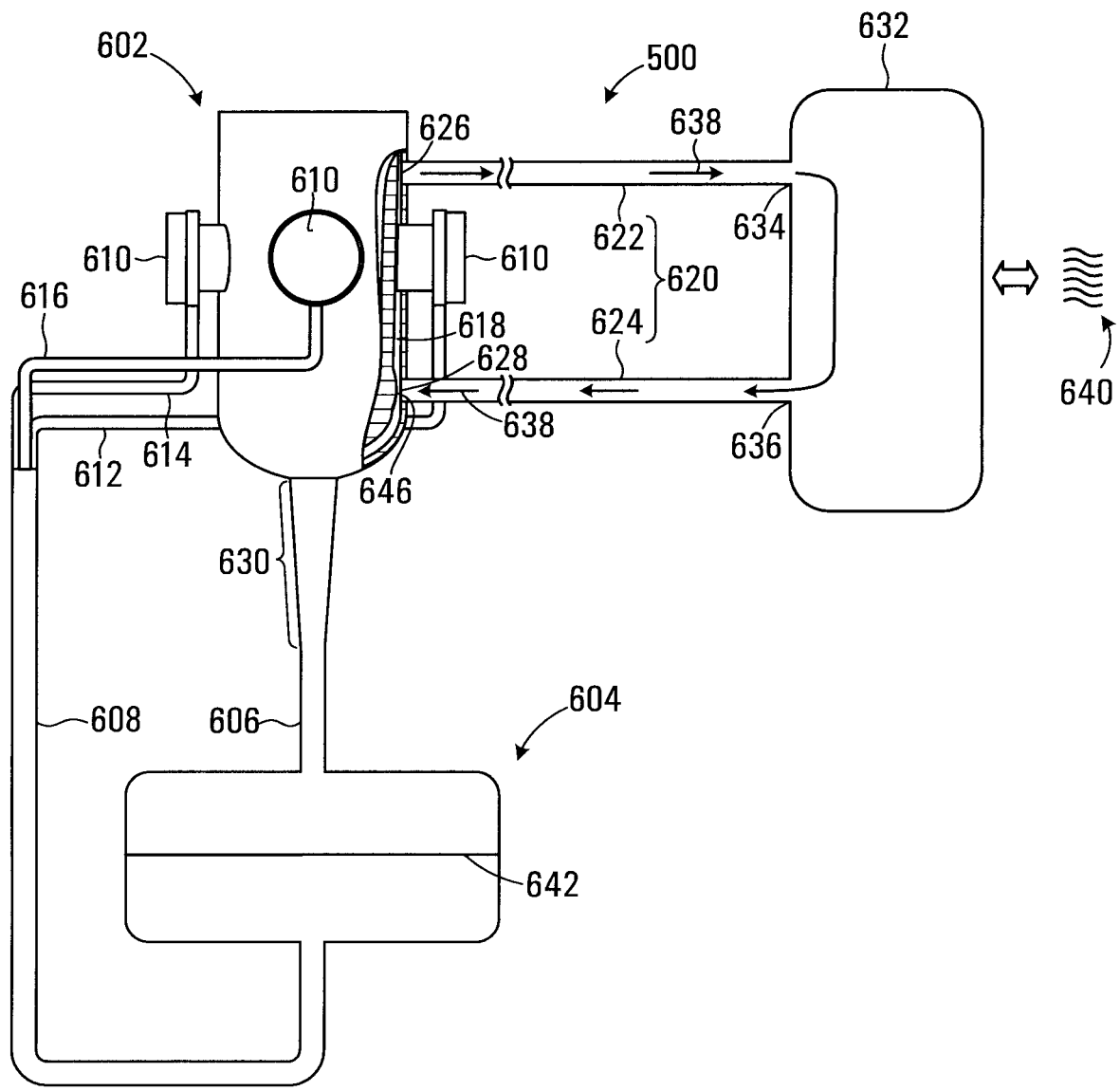
FIG. 6 is a schematic representation of another embodiment of a thermoacoustic transducer.

Referring to FIG. 6, a further thermoacoustic transducer embodiment is shown generally at 600 and includes a thermal converter 602, a mechanical converter 604 connected via ducts 606 and 608 constituting a working volume, and a reservoir volume 632. The thermal converter 602 includes a plurality of thermal converter modules 610 each in fluid communication with the ducts 608 via respective duct sections 612, 614, and 616. Further details of the configuration and operation of the thermal converter 602 were disclosed in commonly owned US Provisional patent application Ser. No. 62/426,418 as referenced above.

A portion of the thermal converter 602 is shown partially cut away to reveal a flow passage 618 that is in fluid communication with a conduit 620 that includes two separate bores 622 and 624 that provide fluid communication between the working volume and the reservoir volume 632. Each of the bores 622 and 624 have respective working volume ends 626 and 628 in fluid communication with spaced apart first and second portions of the working volume within the flow passage 618 of the thermal converter 602. The bores 622 and 624 also have respective reservoir volume ends 634 and 636 at the reservoir volume 632. Each of the bores 622 and 624 has a length L selected as described above to cause pressure oscillations at the working volume ends 626 and 628 to be converted to flow oscillations at the reservoir volume ends 634 and 636 such that periodic fluid flow at the reservoir volume ends is at least twice as large as periodic fluid flow at the working volume ends.

In the embodiment shown, the reservoir volume 632 is further in thermal communication with a heat source or heat sink (in this case shown as a heat source 640) for transferring heat into or out of the reservoir volume 632.

The working gas periodic flow velocity amplitude or pressure amplitude in the working volume at the end 626 of the bore 622 differs from the working gas periodic flow velocity amplitude or pressure amplitude in the working volume at the end 628 of the bore 624. As described above, this causes a steady flow of working gas between the end 626 through the bore 622 to the reservoir volume 632, from the reservoir volume through the bore 624 to the end 628, and through the flow passage 618 and plurality of thermal converter modules 610 to complete a fluid flow loop at the end 626 of the bore 622. The fluid flow is indicated by arrows 638 in FIG. 6.

The steady flow 638 acts to transfer heat between the reservoir volume 632 and the thermal converter 602. As an example, in a heat engine embodiment the heat source 640 may be provided by an exhaust of a combustion engine that is thermally coupled to the reservoir volume 632 to transfer excess heat in the exhaust gasses to the reservoir volume. The steady flow 638 then acts to transfer the heat to the thermal converter 602 and the heat is converted into mechanical motion of a diaphragm 642 in the mechanical converter 604.

The magnitude of the steady flow 638 will be dependent on the locations of the working volume ends 626 and 628 within the working volume, which determines the difference in gas periodic flow velocity amplitude or pressure amplitude between these portions of the working volume.

In the embodiment shown, the flow passage 618 is narrowed by a protrusion 646 proximate the end 628 of the bore 624. The narrowing of the flow passage 618 acts as a Venturi to further increase fluid velocity, thus reducing static pressure at the end 628 of the bore 624. The reduced static pressure acts to draw fluid into the flow passage 618 from the bore 624 and the reservoir volume 632.

The disclosed embodiments have the advantage of providing for fluid communication between the working volume of a thermoacoustic transducer and another volume of working gas while providing sufficiently high acoustic impedance to minimize losses associated with the fluid communication. The fluid communication permits a steady flow of working gas for charging the working volume with working gas, accommodating startup temperature changes and associated pressure differentials during commencement of operations, and also may be employed to establish a steady circulating flow between volumes of working gas as described above.

While specific embodiments have been described and illustrated, such embodiments should be considered illustrative of the invention only and not as limiting the invention as construed in accordance with the accompanying claims. Various disclosed features of above embodiments may be used in combinations other than disclosed above.

What is claimed is:

1. A thermoacoustic transducer apparatus comprising:

at least one thermal converter operable to provide power conversion between acoustic power and thermal power in a pressurized working gas contained within a working volume, a portion of the working volume extending through the at least one thermal converter, the thermoacoustic transducer being operable to cause a periodic flow in the working gas during operation; and a reservoir volume in fluid communication with the working volume through a conduit having a working volume end in fluid communication with the working volume and a reservoir volume end in fluid communication with the reservoir volume, the conduit having a bore size and length operable to cause pressure oscillations at the working volume end to be converted to flow oscillations at the reservoir volume end such that periodic fluid flow at the reservoir volume end is at least twice as large as periodic fluid flow at the working volume end thereby facilitating a steady fluid flow along the conduit for equalization of working gas static pressures between the working volume and the reservoir volume while providing a sufficiently high acoustic impedance at the working volume end to minimize losses due to periodic flows of working gas within the conduit.

2. The apparatus of claim 1 wherein at least a portion of the working volume is enclosed within the reservoir volume.

3. The apparatus of claim 2 wherein a pressure differential due to temperature changes is established between the working gas in the reservoir volume and in the working volume including the working gas in the portion of the working volume enclosed within the reservoir volume, and wherein the bore size of the conduit is selected to facilitate equalization of working gas static pressures between the working volume and the reservoir volume at a rate commensurate with a period of time during which temperatures are changing at commencement of operation of the apparatus.

4. The apparatus of claim 2 wherein the portion of the working volume enclosed within the reservoir volume comprises a portion of the working volume within the at least one thermal converter, and wherein the working gas within the reservoir volume acts to provide thermal insulation between the portion of the working volume within the at least one thermal converter and an environment surrounding the reservoir volume.

5. The apparatus of claim 2 wherein the at least one thermal converter comprises a flow passage defined by walls and wherein the portion of the working volume enclosed within the reservoir volume comprises a portion of the working volume within the walls of the at least one thermal converter and wherein equalization of working gas static pressures between the working volume and the reservoir volume reduces a pressure differential between the at least one thermal converter and the reservoir volume facilitating a reduced thickness of the walls within the at least one thermal converter, the reduced wall thickness being operable to reduce thermal conduction along the walls and to reduce thermal stresses in the walls.

6. The apparatus of claim 1 wherein the conduit has a length of between an eighth of a wavelength and three-eighths of a wavelength.

7. The apparatus of claim 6 wherein for a periodic flow of working gas having a frequency of 500 Hz, the conduit has a diameter greater than 300 μm.

8. The apparatus of claim 1 further comprising a mechanical converter including a portion of the working volume, the mechanical converter being operable to provide power conversion between acoustic power and mechanical power in the working gas, the at least one thermal converter and the mechanical converter being in fluid communication via a further portion of the working volume operable to cause the periodic flow in the working gas during operation.

9. The apparatus of claim 8 wherein the mechanical converter comprises a first chamber and a second chamber separated by at least one diaphragm, the at least one thermal converter comprising a flow passage in fluid communication with each of the first and second chambers and extending through the at least one thermal converter to form an acoustic power loop, the acoustic power loop in conjunction with periodic movement of the at least one diaphragm being operable to cause the periodic flow in the working gas during operation.

10. The apparatus of claim 1 wherein the conduit comprises at least two bores each having respective working volume ends in fluid communication with spaced apart portions of the working volume.

11. The apparatus of claim 10 wherein the at least two bores comprise a first bore and a second bore and wherein the working volume end of the first bore is in fluid communication with a first portion of the working volume and the working volume end of the second bore is in fluid communication with a second portion of the working volume, and wherein a working gas periodic flow velocity amplitude or pressure amplitude at the first portion of the working volume differs from a working gas periodic flow velocity amplitude or pressure amplitude at the second portion of the working volume thus causing a steady flow of working gas between the first portion of the working volume, through the first bore to the reservoir volume and from the reservoir volume through the second bore to the second portion of the working volume.

12. The apparatus of claim 11 wherein the working volume comprises a flow passage between the first portion of the working volume and the second portion of the working volume and wherein the flow passage comprises a narrowed portion operably configured to increase a flow velocity of the periodic flow of working gas within the flow passage thus reducing the working gas static pressure proximate the narrowed portion, one of the working volume ends of the at least two bores being disposed in fluid communication with the working volume proximate the narrowed portion, the reduced working gas static pressure being operable to increase the steady flow of working gas.

13. The apparatus of claim 11 wherein the reservoir volume is in thermal communication with one of a heat source and a heat sink and wherein the steady flow of working gas is operable to transfer heat between the reservoir volume and the at least one thermal converter.

14. The apparatus of claim 11 wherein the portion of the working volume that extends through the at least one thermal converter is in fluid communication with a thermal buffer section of the working volume that separates two different locations of the working volume at differing temperatures, and wherein the steady flow of working gas is selected to change the working gas temperature distribution within the thermal buffer section to change an effective acoustic length of the thermal buffer section of the working volume.

15. The apparatus of claim 11 wherein the steady flow of working gas is selected by adjusting a valve within one of the at least two bores or the reservoir volume, the valve being operable to control the steady flow of working gas.

16. The apparatus of claim 1 wherein a capacity of the reservoir volume is selected to be large in comparison with a capacity of the working volume to reduce effects due to leakage of working gas from the thermoacoustic transducer.

17. The apparatus of claim 1 wherein a capacity of the reservoir volume is selected to reduce a static pressure change due to changes in an operating temperature within the at least one thermal converter.

18. The apparatus of claim 1 wherein the working gas comprises at least one of hydrogen and helium.

19. The apparatus of claim 1 wherein the working volume end of the conduit is in fluid communication with a portion of the working volume having a low working gas pressure swing amplitude in comparison with other portions of the working volume.

20. The apparatus of claim 1 wherein the reservoir volume comprises a fluid port for connecting to a supply of working gas, the fluid port having a valve selectively operable to permit recharging of the reservoir volume and the working volume to replace working gas that is lost due to leakage from the thermoacoustic transducer.

21. The apparatus of claim 20 wherein the fluid port acts as a vacuum port for connecting to a vacuum source during an initial evacuation of the working volume and the reservoir volume prior to charging the working volume with the working gas.

* * * * *